United States Patent [19]

Ohsawa

[11] Patent Number: 5,519,699
[45] Date of Patent: May 21, 1996

[54] METHOD OF PROTOCOL TERMINATION AND A PACKET DATA COMMUNICATION SYSTEM APPLIED THE METHOD

[75] Inventor: Tomoki Ohsawa, Tokyo, Japan

[73] Assignee: NEC Corporation, Japan

[21] Appl. No.: 290,180

[22] Filed: Aug. 15, 1994

[30] Foreign Application Priority Data

Dec. 17, 1993 [JP] Japan .................................. 5-317579

[51] Int. Cl.[6] .............................. H04L 1/16; H04L 12/54
[52] U.S. Cl. ........................ 370/60; 370/85.13; 370/94.1; 370/97; 371/32
[58] Field of Search ........................... 370/60, 61, 85.13, 370/94.1, 97, 68.1; 371/32, 33, 67.1; 178/4.1 C

[56] References Cited

U.S. PATENT DOCUMENTS

| | | | |
|---|---|---|---|
| 4,092,630 | 5/1978 | van Duuren et al. | 371/32 |
| 4,586,086 | 4/1986 | Ohzeki | 371/33 |
| 4,862,461 | 8/1989 | Blaner | 371/33 |
| 5,357,525 | 10/1994 | Moriue et al. | 371/32 |

OTHER PUBLICATIONS

"Satellite Packet Communication Architecture", Kazutomo Kobayashi, et al, IEEE International Conference on Communications, Jun. 7–10, 1987, pp. 239–243.
"High–Speed Packet Communication Using Satellite Links—Study on Flow Control", Kazutomo Kobayashi, et al, National Conference Record, 1987, Information and Systems, The Institute of Electronics, Information and Communication Engineers, Part 2, Nov. 1–4, 1987, p. 359, (in Japanesae with English translation).
"High–Speed Packet Communication Using Satellite Links—Link Level Flow Control Protocols on LLC", Hideyuki Fukuoka, et al, National Conference Record, 1987, Information and Systems, The Institute of Electronics, Information and Communication Engineers, Part 2, Nov. 1–4, 1987, p. 360, (in Japanesae with English translation).
"Performance Improvement for Satellite Mesh LAN Interconnection", Tomoki Ohsawa, Proceedings of the 1993 IEICE Fall Conference, Sep. 5–8, 1993, p. 2–160, (in Japanese with English translation).

Primary Examiner—Benedict V. Safourek
Attorney, Agent, or Firm—Ostrolenk, Faber, Gerb & Soffen

[57] ABSTRACT

In packet communication, when applying end-to-end control protocol such as the fourth layer protocol of Open Systems Interconnection (OSI), a large delay existing in only a portion within the network gives rise to an extreme drop in throughput. The present invention is intended to avoid this problem without altering the fourth layer protocol. This network is structured such that a sending terminal and a receiving terminal are connected by a plurality of routers, and a portion of the routers have large propagation delay. Each router is constructed from a virtual terminal controller that, from the time connection is established until disconnection of the communication circuit, operates identically to the opposing terminal upon receiving a signal from the terminal to which it is connected; a memory circuit that stores data upon reception of the data; and a data link controller that raises throughput of a circuit having large delay. Accordingly, because transmission of succeeding data can be carried out by receiving an ACK signal from the router connected to the sending terminal without waiting for the ACK signal response from the receiving terminal, gaps in transmission are reduced and the influence of intermediate circuits having large propagation delay can be avoided.

5 Claims, 10 Drawing Sheets

METHOD OF PROTOCOL TERMINATION AND A PACKET DATA COMMUNICATION SYSTEM APPLIED THE METHOD

BACKGROUND OF THE INVENTION

1. Field of the Invention

The present invention relates to a method of packet transmission and a packet data communication system.

2. Description of the Related Art

In packet data communication used in high-speed transmission lines of which Local Area Networks (LAN) are representative, in order that packet transmission delay not become a problem, flow control by fourth level end-to-end protocol, of which Transport Control Protocol (TCP, RFC) is representative, generally employs a small window size. However, because window size is related to the memory capacity of a terminal, it is desirable to make the window size as small as possible and reduce the memory capacity.

However, in a large-scale network such as for connection of inter-LAN communication, the type of intermediate circuits are unknown. For example, in a interLAN connection in which connections are made by satellite circuits within the network, because circuit delay becomes great in parts, throughput will drop even though satellite circuits are high-speed if the window size is small. FIG. 1 shows an example of the problem of throughput drop in a satellite LAN connection. If the window size is small, the delay in the satellite circuit cannot be absorbed and, as shown in FIG. 1, the throughput cannot attain the speed of satellite circuits. This problem of drop in throughput that occurs in the prior technology can be solved by enlarging the window size, but this solution gives rise to a problem of the increase in memory capacity.

If circuits having great delay time exist as a portion of a communication circuits, this type of memory increase must be carried out at all terminals that may use that circuit, and this poses difficult problems for network design.

SUMMARY OF THE INVENTION

The object of the present invention is to provide protocol procedure for end-to-end link connection and a method that does not involve any change in terminal memory capacity and does not cause a drop in throughput.

To achieve the above-described object, a method of protocol termination in a packet communication system according to the present invention is a method of protocol termination of packet communication in a packet data communication network, in which a sending terminal attempting transmission and a destination receiving terminal are relayed by at least two routers, a first router is connected to the sending terminal and a second router is connected to the receiving terminal, the routers monitor and operate a circuit connection and protocol termination of packet transmission between the sending terminal and the receiving terminal, and the first router having the first store step of storing data sent from the sending terminal and the first sending step of sending the data received from the sending terminal, and the second router having the second store step of storing the data received from the first router and the second sending step of sending the data received from the first router to the receiving terminal, wherein said method further comprising the step of sending a control packet from the first router to the sending terminal to acknowledge the reception of data, which has the same format of control packet to be returned by the receiving terminal when the receiving terminal receives the data, upon receiving the data from the sending terminal.

The method of protocol termination of packet communication may further comprise a first erasing step of erasing the data stored by the first and second store steps in each of the routers, the first router erases upon receiving the returned control packet sent from the second router and the second router erases upon receiving the returned control packet from the receiving terminal.

The method of protocol termination of packet communication may comprise a second erasing step of erasing the data stored by the first and second store steps in each of the routers upon receiving a returned acknowledge signal packet which is sent from the device in downstream after acknowledging the normal reception of the data.

The method of protocol termination of packet communication may perform a flow control by comprising each of the routers a large window size which is available for performing the flow control without being affected by a propagation delay.

To achieve the above-mentioned object, a packet communication system according to the present invention is a packet communication system, in which a sending terminal attempting transmission and a destination receiving terminal are relayed by at least two routers, a first router is connected to the sending terminal and a second router is connected to the receiving terminal, the routers monitor and operate a circuit connection and packet transmission between the sending terminal and the receiving terminal, and the first router provides a first store means for storing data sent from the sending terminal and a first sending means for sending the data received from the sending terminal to the second router, and the second router provides a second store means for storing the data received from the first router and a second sending means for sending the data received from the first router to the receiving terminal, wherein the system comprising, means for sending a control packet from the first router to the sending terminal to acknowledge the reception of data, which has the same format of control packet to be returned from the receiving terminal when the receiving terminal receives the data, upon receiving the data from the sending terminal.

The packet communication system further comprise a first means for erasing the data stored by the first and second store means in each of the routers, the first router erases upon receiving the returned control packet from the second router and the second router erases upon receiving the returned control packet from the receiving terminal.

The packet communication system may further comprises:

- link response means for responding a acknowledge signal packet representing a normal reception from the second router to the first router when the second router receives data from the first router;
- first check means for checking the normality of received data provided in the routers and terminals;
- second erasing means for erasing data stored by the first and second store means in each of the routers upon receiving the acknowledging signal package from the second router at the first router and from the receiving terminal at the second router;
- retransmitting means for retransmitting data when sent data is not received normally, proving in the routers and terminals.

The packet communication system may provide each of the routers comprising a large window size which is available for performing a flow control without being affected by a propagation delay.

DETAILED DESCRIPTION OF THE PREFERRED EMBODIMENTS

Figure 1:
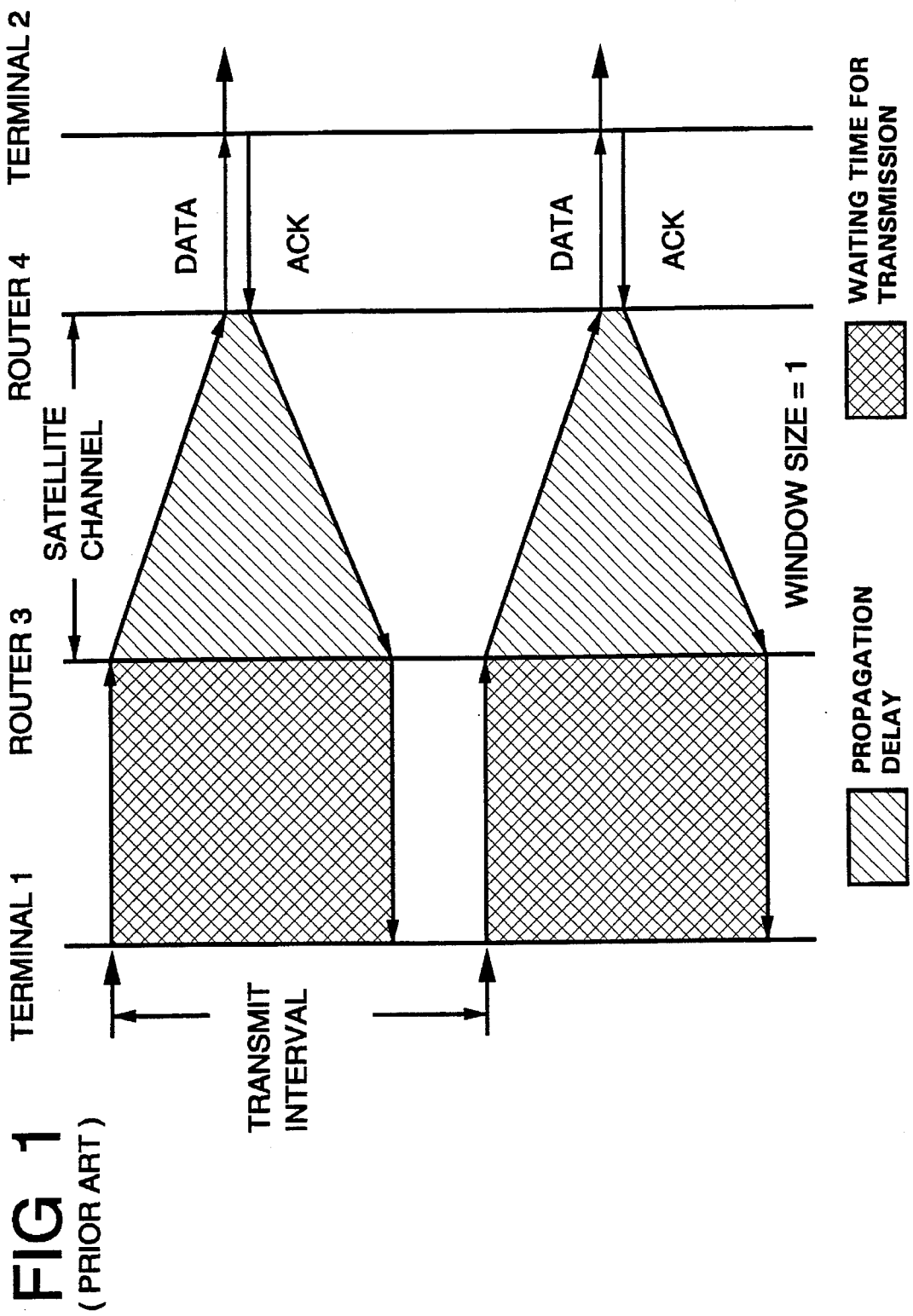
FIG. 1 is a conceptual view showing problems in packet communication systems of the prior art.
Figure 2:
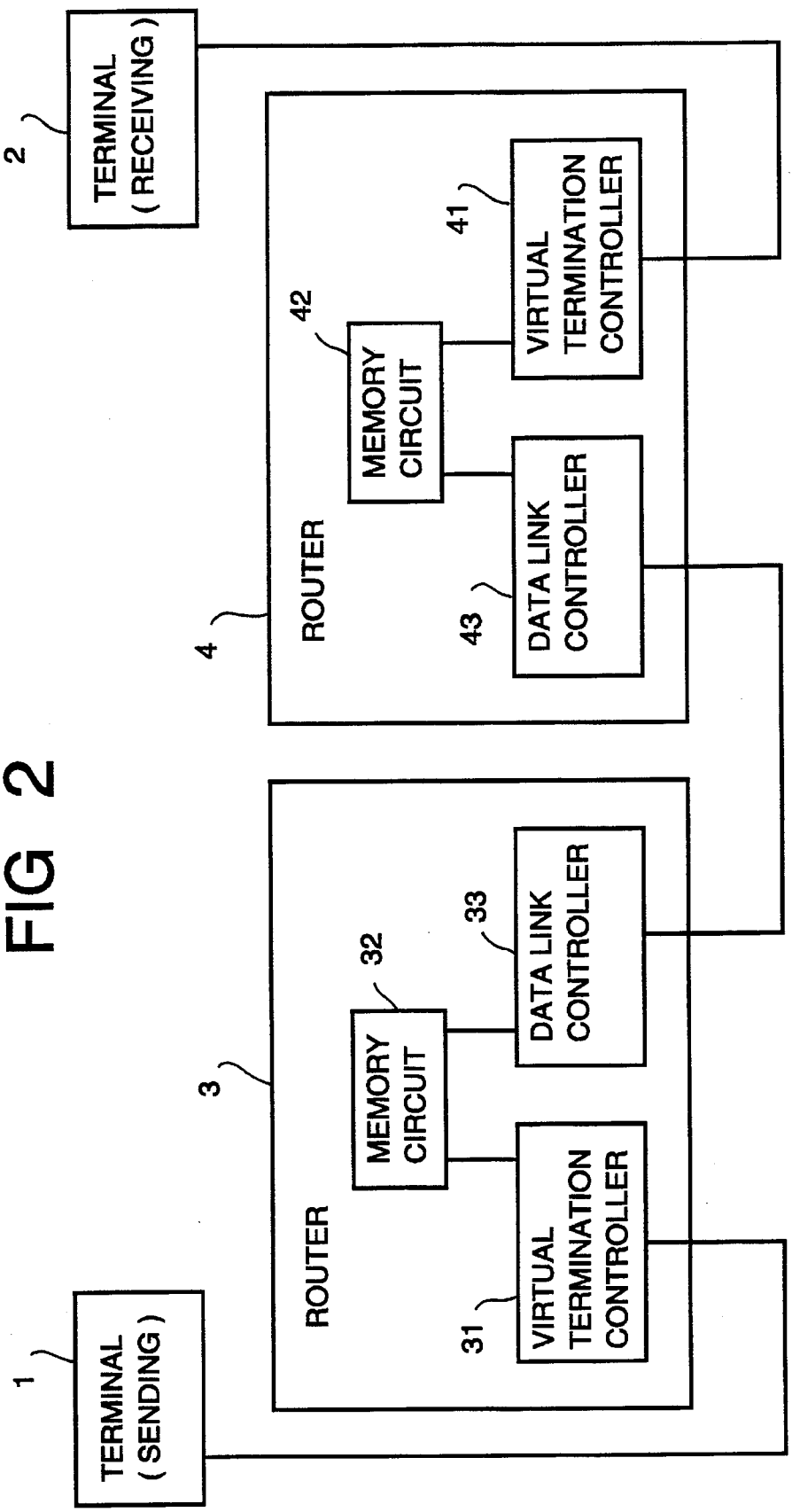
FIG. 2 is a block diagram showing the circuit structure device adapted to a first embodiment on which a packet communication method according to the protocol termination of the present invention is applied.

FIG. 2 shows the network structure of a first embodiment on which a packet communication method according to the protocol termination of the present invention is applied. This construction has a basic connection structure of a sending terminal 1 and a receiving terminal 2 connected by routers 3, 4, i.e., repeaters, in which the effect of delay between the routers 3, 4 is improved. The routers 3, 4 are constructed from virtual termination controllers 31, 41, memory circuits 32, 42, and data link controllers 33, 43 for controlling transmission between the routers. Router 3 is connected to the sending terminal 1, and router 4 is connected to the receiving terminal 2.

Figure 3:
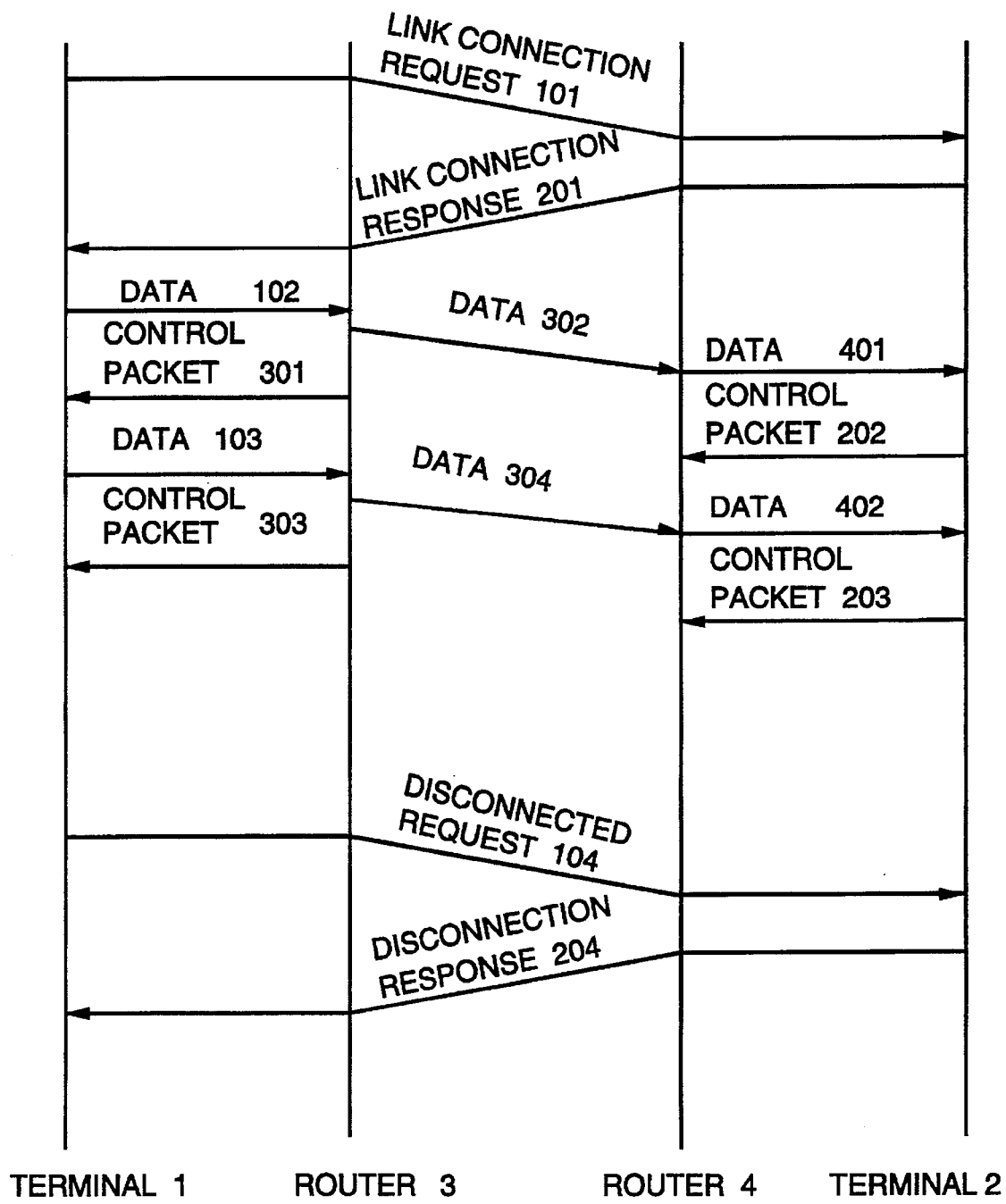
FIG. 3 is a sequence chart of an embodiment of the first invention according to the present invention.

The operation of the first embodiment of the present invention shown in FIG. 2 will be described with reference to the sequence chart of FIG. 3.

The sending terminal 1 sends out a connection request 101 when it begins transmitting to the receiving terminal 2. Routers 3, 4 monitor this connection request 101 by virtual termination controllers 31, 41. When the receiving terminal 2 sends back a connection response signal 201 to this connection request 101, a circuit is connected between the sending terminal 1 and the receiving terminal 2. Router 3 monitors this state, and after the connection is established, stores data 102 (succeeding data will be enclosed in parentheses (103)) sent out from the sending terminal 1 into memory circuit 32, and transmits the data over the circuit between the routers as data 302 (304) through the specific transmission mode between the data link controllers 33, 43. Data received at data link controller 43 are stored in memory circuit 42 and transmitted from the virtual termination controller 41 to the receiving terminal 2 as data 401 (402). At this time, the virtual termination controller 31 transmits to the sending terminal 1 a control packet 301 identical to a control packet 202 (203) sent by the receiving terminal 2 upon receiving the data. The virtual termination controller 41 transmits data 401 (402) to the receiving terminal 2 in the same manner as transmitted by the sending terminal 1. However, the control packet 202 (203) sent from the receiving terminal 2 is stopped at the virtual termination controller 41, and accordingly, no reception control packet 203 (204) other than for circuit connection or disconnection is sent from router 3 in the direction of router 4.

Figure 4:
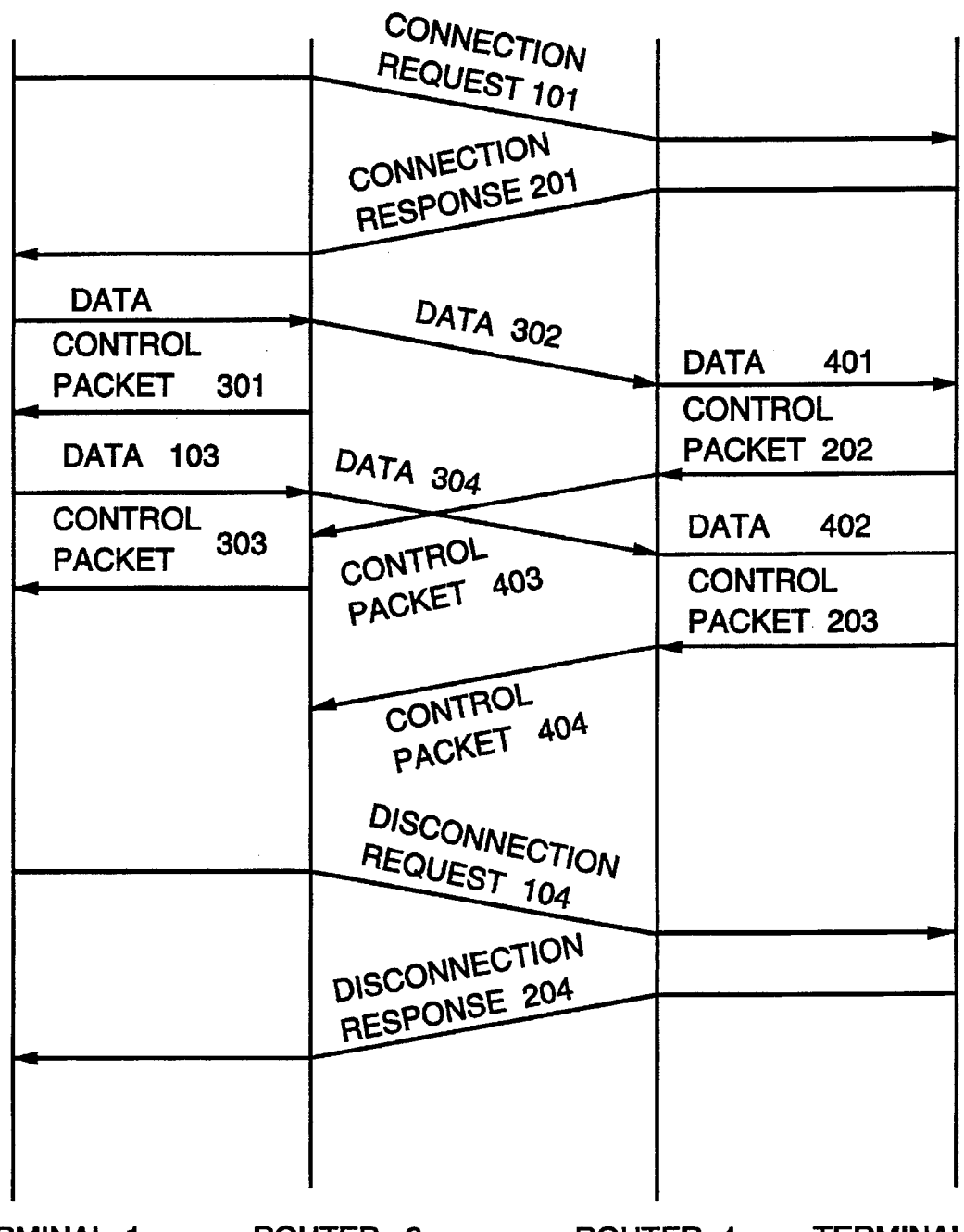
FIG. 4 is a sequence chart of an embodiment of the second invention according to the present invention.

FIG. 4 shows a signaling sequence chart of a packet transmission, in addition to the first embodiment, according to the second embodiment of the present invention.

The receiving terminal 2 sends to router 4 a control packet 202 (203) directed to the sending terminal 1 to indicate confirmation of reception, and the same command is sent from router 4 to router 3 as control packet 403 (404), and in this way, when virtual terminal controllers 31, 41 confirm that the data have been transferred to the receiving terminal 2, the virtual terminal controllers 31, 41 erase the corresponding data from the respective memory circuits 32, 42, thereby preventing overflow of memory circuits 32, 42, and packet transmission is ended by virtually terminating the protocol.

Figure 5:
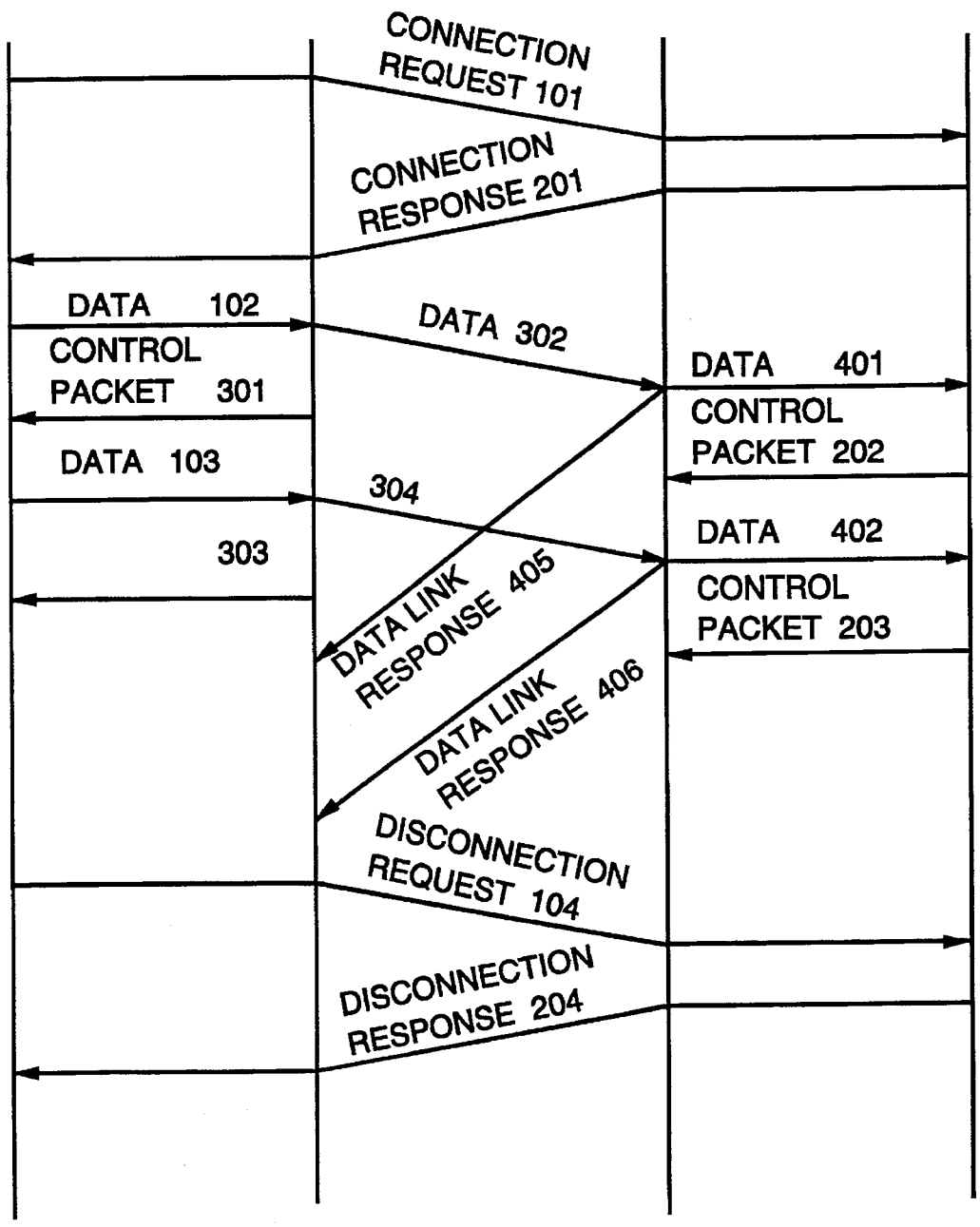
FIG. 5 is a sequence chart of an embodiment of the third invention according to the present invention.

As shown in FIG. 5, in the first and second embodiments, the third embodiment of the present invention employs in the data link controllers 33, 43 a retransmission protocol peculiar to the connection between the routers 3, 4. In cases where the data are received normally, data 302 (304) stored in the memory circuit 32 of the sending side router 3 are erased in accordance with reception of data link response 405 (406) from the receiving side router 4. The data in the memory circuit 42 on the receiving side router 4 are erased according to the reception of control packet 202 (203) sent by the receiving terminal 2. In addition, if it is found that the last data has not been received, a retransmission request is sent and the unreceived data are received.

The fourth embodiment of the present invention, by employing a flow control of data link controllers 33, 43 using a larger window size than the protocol using the window size applied to the first, second, and third embodiments, performs transmission preventing the influence of the transmission delay between the routers. In this way, the influence of delay in portion of transmission between routes 3 and 4 does not appear as a drop in transmission efficiency between sending and receiving terminals even when a small window size is used in the transmission of the sending terminal 1 and the receiving terminal 2.

Figure 6:
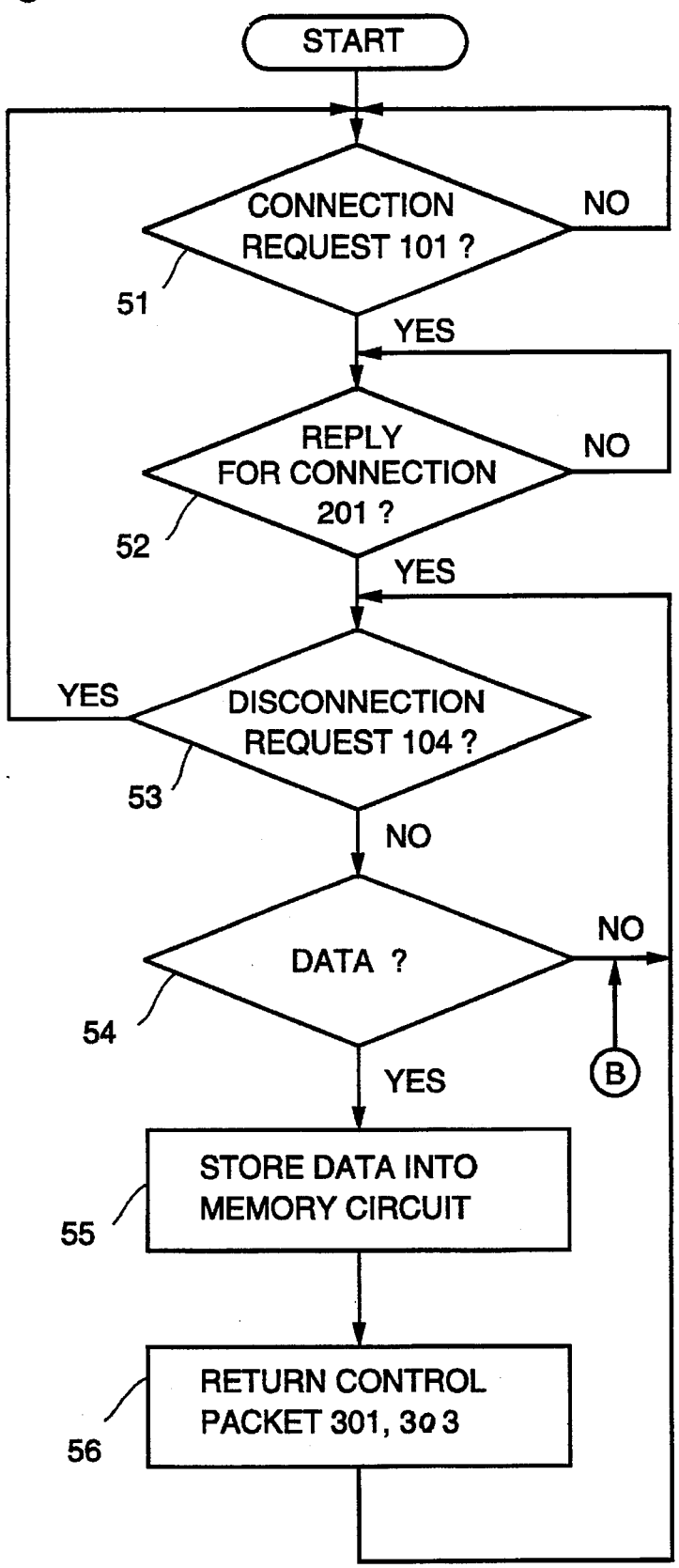
FIG. 6 is a flow chart of the operation of a router connected to a sending side in an embodiment of the first invention of the present invention.

FIG. 6 is a flow chart showing the virtual terminal controllers 31 of the router 3 on the sending side. Router 3 detects connection request 101 (Step 51), detects the connection response 201 in response to this request from the receiving terminal 2 (Step 52), and because no request for disconnection 104 is detected following this (Step 53), enters a data input waiting state when the circuit connection is confirmed. When data are sent in this state, virtual terminal controller 31 performs monitoring (Step 54) and the data are stored in memory circuit 32 (Step 55). The stored data are sent by data link controller 33 to the opposite router 4. Simultaneously, router 3 sends to sending terminal 1 the same control packet which is transmitted when the receiving terminal 2 has received a data (Step 56).

Figure 7:
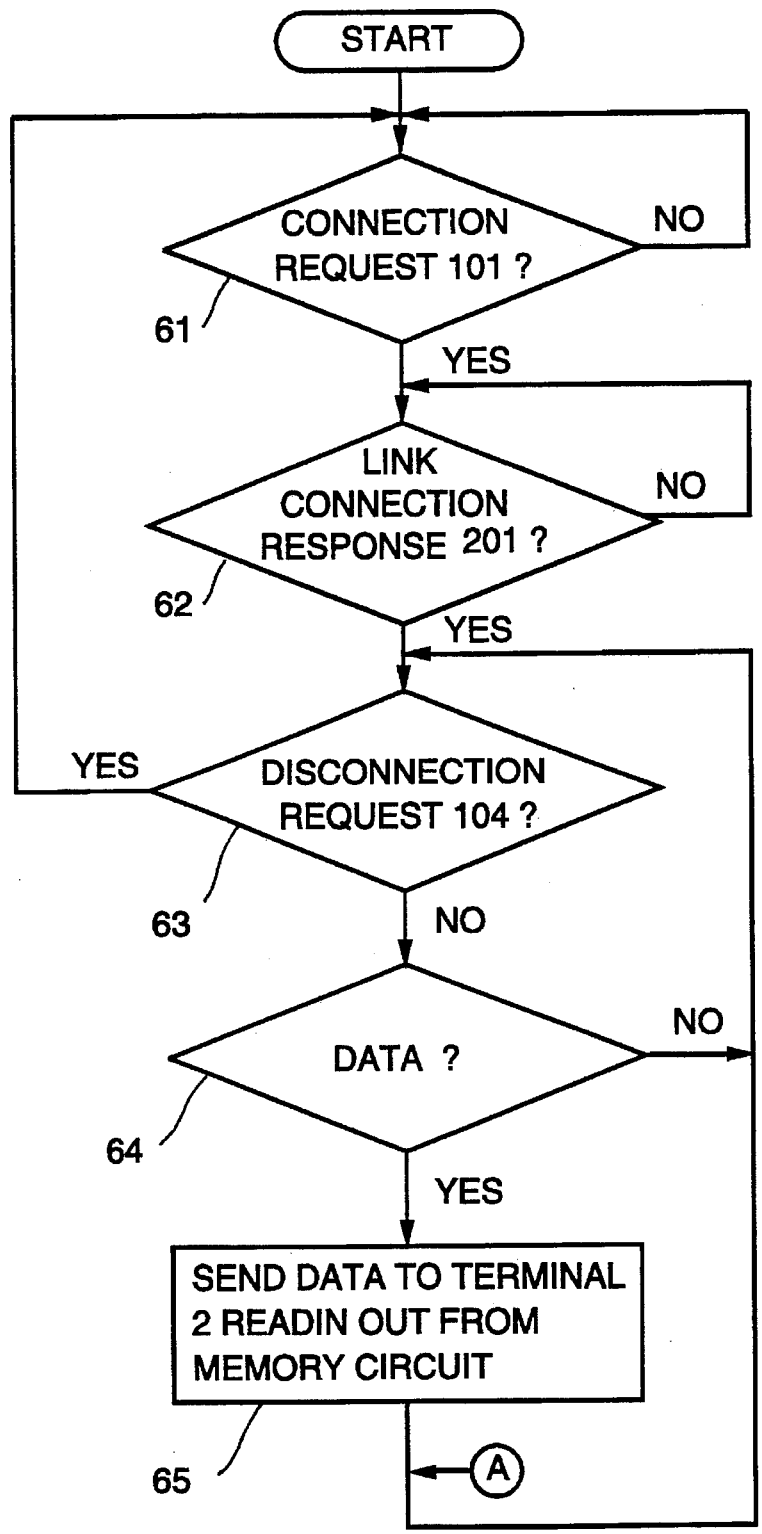
FIG. 7 is a flow chart of the operation of a router connected to a receiving side in an embodiment of the first invention of the present invention.

FIG. 7 is a flow chart showing the operation of a virtual terminal controller 41 of router 4 on the receiving side according to the first embodiment of the present invention. When router 4 detects a connection request 101 (Step 61), detects a connection response signal 201 from the receiving terminal 2 (Step 62), and monitoring no disconnection request 104 from the sending terminal 1 (Step 63), confirms the circuit connection and enters into a data waiting state. In this state, when data 302 are sent from router 3, data link controller 43 of router 4 receives the data 302 (Step 64), virtual terminal controller 41 stores the data into memory circuit 42, following which data 401 are sent to the receiving terminal 2 (Step 65). When the receiving terminal 2 receives data 401, it sends out control packet 202, and router 4 receives this packet but does not transmit it to router 3.

The second invention discloses a method of clarifying the timing of the erasing of the stored received data using the data reception confirmation command, a control packet, sent from receiving terminals shown in the first invention.

Figure 8:
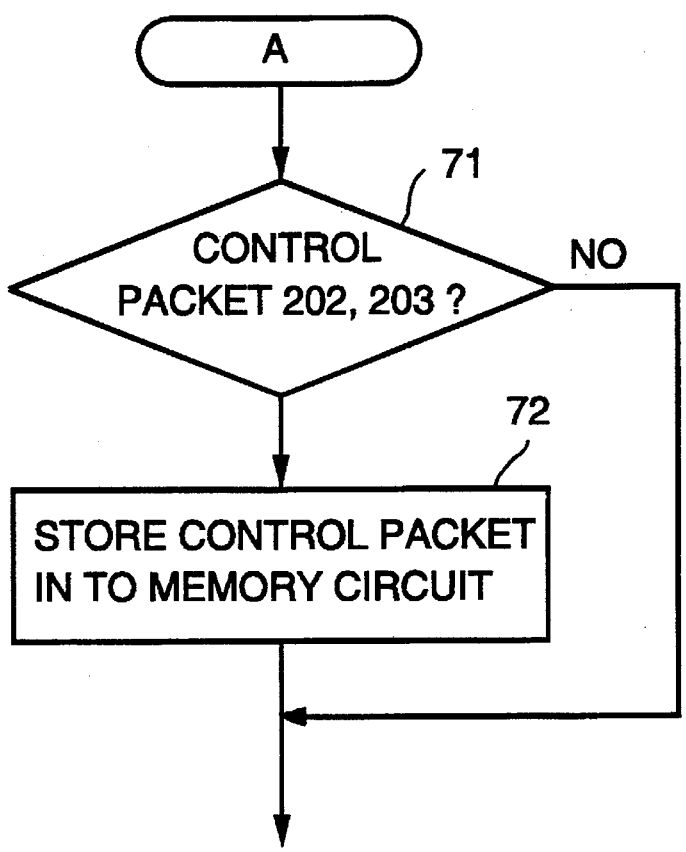
FIG. 8 is a supplementary flow chart of a router connected to a receiving side in an embodiment of the second invention of the present invention.
Figure 9:
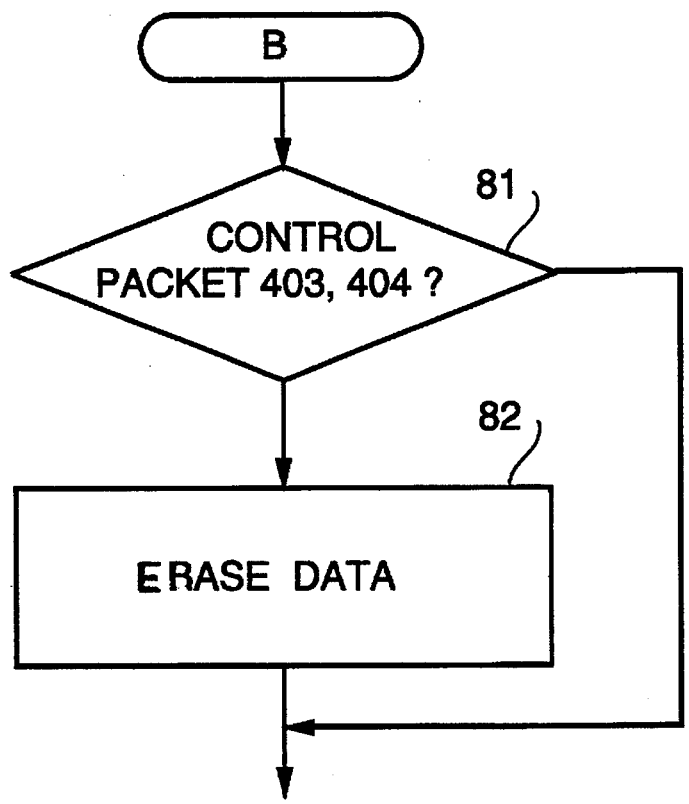
FIG. 9 is a supplementary flow chart of a router connected to a sending side in an embodiment of the second invention of the present invention.

As an embodiment of this invention, router 4 acts as additional flow chart of FIG. 8 added at point A of the flow chart of FIG. 7. In other words, when router 4 confirms the reception of control packet 202 (203) sent from the receiving terminal 2 (Step 71), virtual terminal controller 41 stores the control packet 202 (203) into memory circuit 42 (Step 72), and erases corresponding data 302. Subsequently, router 4 transmits control packet 202 as control packet 403 (FIG. 4) to router 3, and as shown in the additional flow chart shown in FIG. 9 which is connected to point B shown in FIG. 6, router 3 receives control packet 403 and stores it into memory circuit 32 (Step 81), and erases stored data 102 (Step 82).

The third invention discloses a method of performing a high-quality, rapid data erasing, in addition to the first and the second inventions, by providing a protocol to confirm the reception of data between data link controllers 33 and 43. An embodiment of the data link controllers 33, 43 of the third invention can be easily realized by using Logical Link Control (LLC shown in IEEE 802.2 Standard). In this case, erasing of data at router 3 does not use a control packet 202 transmitted from the receiving terminal 2, but rather, is carried out in accordance with determination of data link controller 33 by receiving a data link response of normal reception sent from routs 4.

The fourth invention improves transmission speed even in the case of partial delay between data links by providing flow control of a large window size in addition to the above-described data link protocol. An example of flow control is disclosed in Fukuoka Hideyuki and Kobayashi Kazutomo, 1987. High-Speed Packet Communication Using Satellite Links: Study on Flow Control. *National Convention of the Institute of Electronic Information Communications Academy.* 2: 90 (359) and Fukuoka Hideyuki and Kobayashi Kazutomo. 1987. High-Speed Packet Communication Using Satellite Links: Link Level Flow Control on LLC. *National Convention of the Institute of Electronic Information Communications Academy.* 2: 91 (360).

As described hereinabove, the present invention can prevent drops in packet transmission throughput caused by data links having large delay without any need to change end-to-end protocol procedure or terminal memory capacity in any way. The second invention clarifies the timing of erasing of data from memory circuits. The third invention ensures transmission of data and increases quality even when circuit state between routers is bad.

The fourth invention, by enlarging window size between routers only, prevents drops in throughput caused by propagation delay while effectively using the memory circuits.

Figure 10:
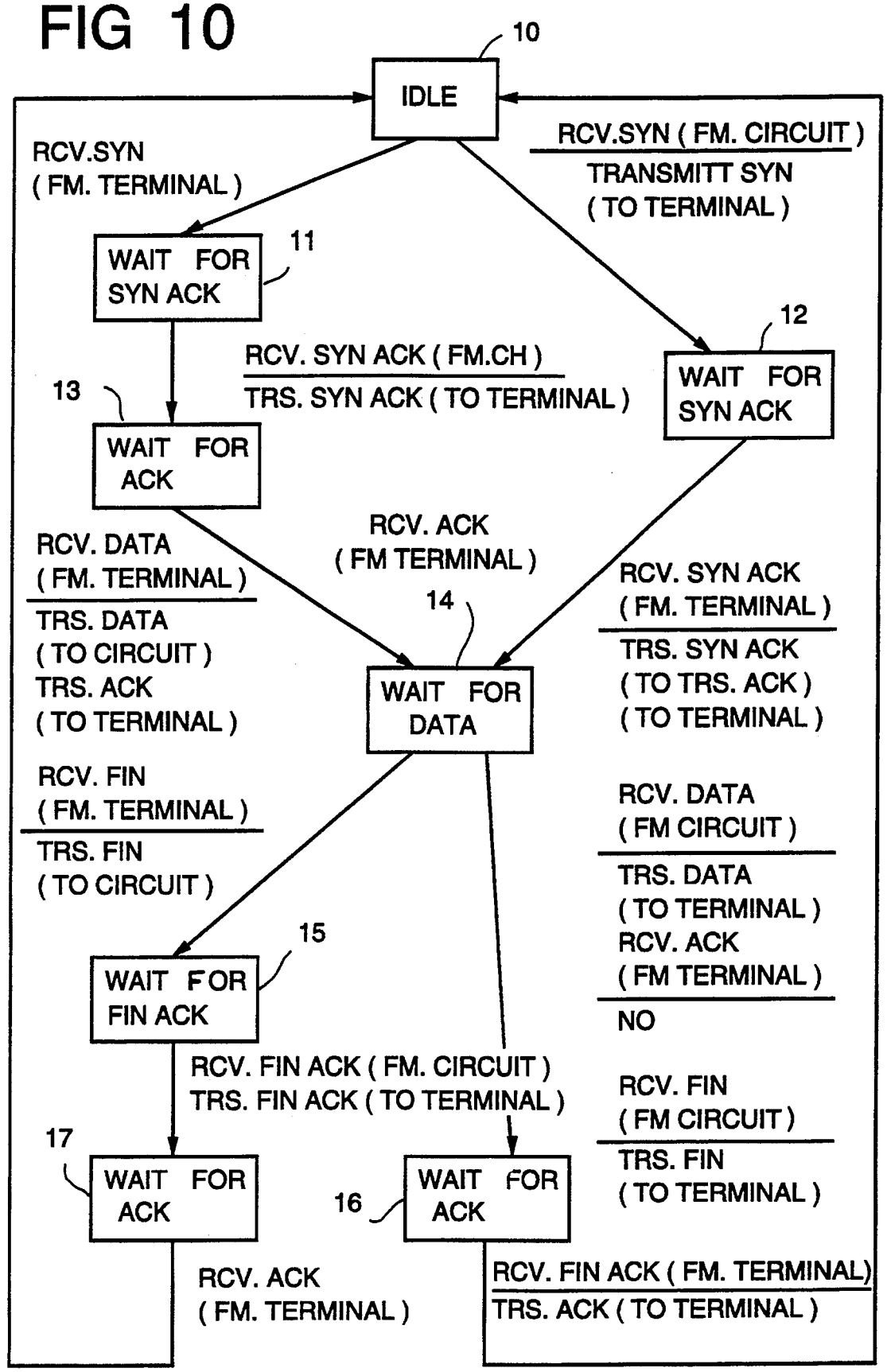
FIG. 10 shows the state transitions of virtual termination controllers 31, 41 for a case in which TCP/IP is the protocol in the present invention.

FIG. 10 is a state transition diagram of the virtual termination controller of the present invention in a case in which the actual protocol between the sending and receiving terminals is TCP/IP (Transmission Control Protocol/Internet Protocol).

In Idle State 10, in which communication is not being performed, when a send request SYN is received from the sending terminal 1, virtual terminal controller 31 sends the send request SYN to the circuit and makes a state transition to Wait for SYN ACK 11.

In Idle State 10, virtual terminal controller 41, when receiving the send request SYN from the circuit, transmits the sent request SYN to the receiving terminal 2 and makes a state transition to Wait for SYN ACK 12. When virtual terminal controller 41 in the Wait for SYN ACK State 12 receives SYN ACK from the receiving terminal 2, it transmits SYN ACK to the circuit, sends ACK to the receiving terminal 2, and makes the state transition to Wait for Data 14.

When virtual terminal controller 31 in the Wait for SYN ACK state 11 receives SYN ACK from the circuit, it transmits that SYN ACK to the sending terminal 1, and makes a state transition to Wait for ACK 13, after which it makes the state transition to Wait for Data 14 when it receives ACK from the sending terminal 1.

When data are transmitted from the sending terminal 1, virtual terminal controller 31 receives the data and stores the data to memory circuit 32, and further, sends the data to the circuit and sends ACK to the sending terminal 1.

Virtual terminal controller 41, having received the data from the circuit, sends the data to the receiving terminal 2 and receives the ACK from the receiving terminal 2 as acknowledgement that receiving terminal 2 has received the data.

When virtual terminal controller 31 receives a disconnection request FIN from the sending terminal 1, it sends the disconnection request FIN to the circuit and makes the state transition to Wait for FIN ACK 15.

When virtual terminal controller 41 receives the disconnection request FIN from the circuit, it sends disconnection request FIN to the receiving terminal 2 and makes the state transition to Wait for FIN ACK 16.

When receiving terminal 2 receives the disconnection request FIN and sends back FIN ACK, virtual terminal controller 41 sends back ACK to the receiving terminal 2, sends out the received FIN ACK and makes the state transition to Idle State 10.

When virtual terminal controller 31 receives FIN ACK from the circuit, it transmits to the sending terminal 1 and makes a state transition to Wait for ACK 17, and after receiving an ACK response from the sending terminal 1, makes the state transition to Idle State 10.

Figure 11:
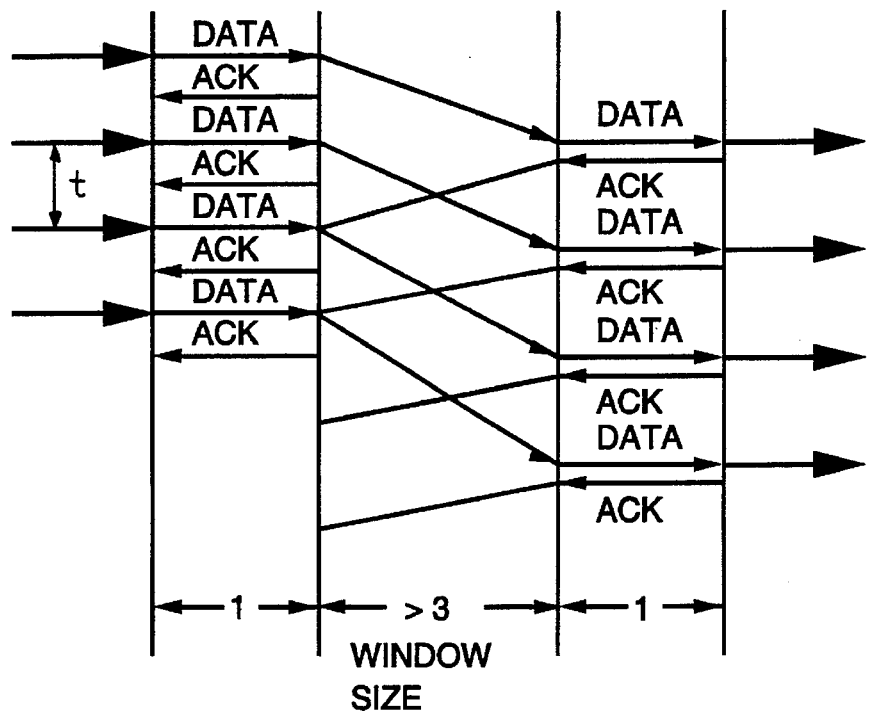
FIG. 11 is a conceptual diagram of the effect of the present invention.

FIG. 11 presents a conceptual illustration of the effect of the present invention. In data transmission from the sending terminal 1, succeeding data are transmitted in accordance with reception of virtual termination control packet ACK from the satellite router 3, and consequently, if the window size in this case is greater than 3, at least two more data can be transmitted.

Figure 12:
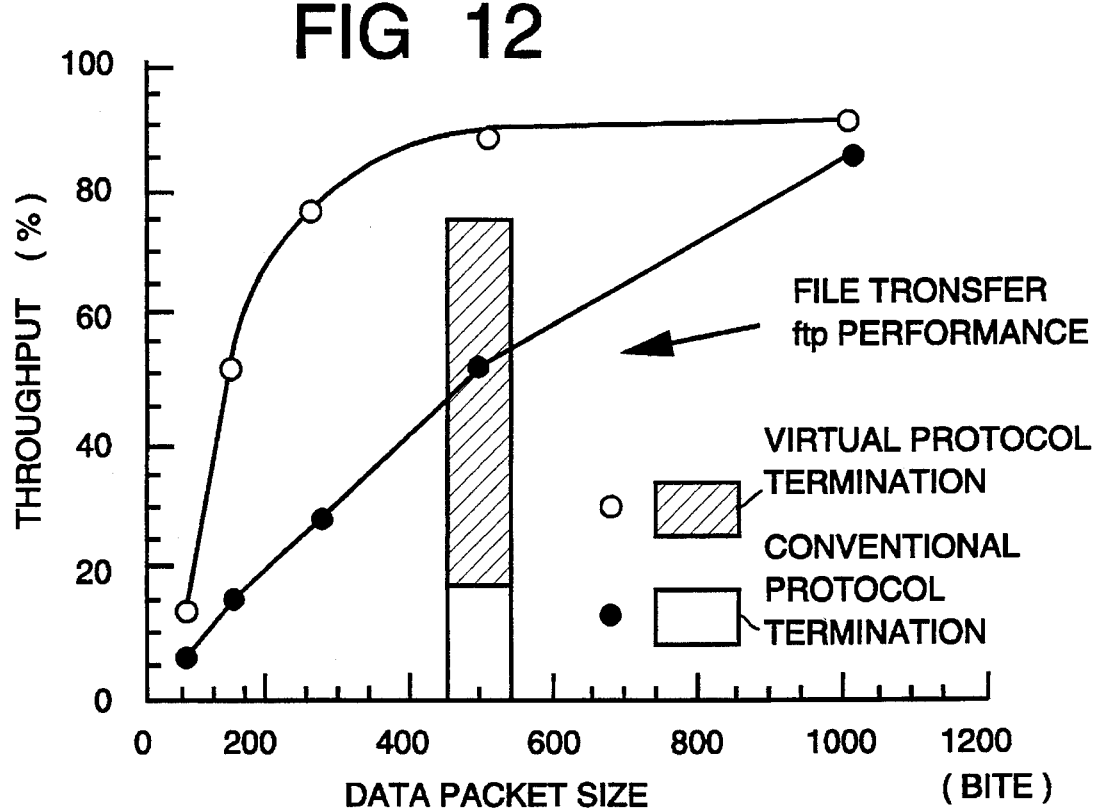
FIG. 12 shows the quantitative effect in a case of actual employment of the present invention.

FIG. 12 presents the results of an experiment in which the LLC window size was 128, and the satellite circuit on one side was 384 bps. As shown in these experimental results, in methods of the prior art, throughput was improved by enlarging the packet size, but at the general packet size of 512 bytes in TCP, throughput dropped by about 50%, while the present invention achieved throughput of 90%. Furthermore, in application software such as file transfer performance (FTP), the higher level protocol has an influence resulting in a fivefold increase for the method of the present invention over the method of the prior art.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of protocol termination of packet communication in a packet data communication network, in which data transmission between a sending terminal attempting transmission and a destination receiving terminal are relayed by at least two routers, a first router connected to the sending terminal and a second router connected to the receiving terminal, said routers monitoring and operating a circuit connection and protocol termination of packet transmission between said sending terminal and said receiving terminal, the first router having a first storing step for storing data sent from the sending terminal and a first sending step for transmitting the data stored by the first storing step and a second router having a second storing step for storing the data received from the first router and a second sending step for sending the data stored by the second storing step to the receiving terminal, and the first router sending a control packet to the sending terminal to acknowledge the reception of data, said control packet has the same format as a control packet returned by the receiving terminal when the receiving terminal receives the data from the second router, the method comprising the step of:

providing a window which is a buffer memory having sufficient capacity for performing an end-to-end protocol flow control without being affected by a propagation delay in each of the routers and terminals.

2. The method of protocol termination of packet communication as claimed in claim 1, wherein the method comprising the further step of:

providing a first erasing step of erasing the data stored by the first and second storing steps in each of the routers, with the first router erasing upon receiving the returned control packet sent from the second router and the second router erasing upon receiving the returned control packet from the receiving terminal.

3. A packet communication system, in which data transmission between a sending terminal attempting transmission and a receiving terminal are relayed by at least two routers, a first router connected to the sending terminal and a second router connected to the receiving terminal, said routers monitoring and operating a circuit connection and packet transmission between said sending terminal and said receiving terminal, the first router providing a first storing means for storing data sent from the sending terminal and a first sending means for sending the data stored by the first storing means to the second router, the second router providing a second storing means for storing data received from the first router and a second sending means for sending data stored by the second storing means to the receiving terminal, and means sending a control packet from the first router to the sending terminal to acknowledge the reception of data, said control packet has the same format as a control packet returned by the receiving terminal when the receiving terminal receives the data from the second router, the packet communication system comprising:

a link response means responding by an acknowledge signal packet representing a normal reception from the second router to the first router when the second router receives data from the first router;

a check means checking the normality of received data provided in the routers and terminals;

a first erasing means erasing data stored by the first and second storing means in each of the routers upon receiving the acknowledging signal packet from the second router at the first router and from the receiving terminal at the second router;

retransmitting means retransmitting the stored data when receiving a denying signal from the check means in the routers and terminals.

4. The packet communication system as claimed in claim 3, wherein each of the routers comprises a window which is a buffer memory having sufficient capacity for performing an end-to-end protocol flow control without being affected by a propagation delay in each of the routers and terminals.

5. The packet communication system as claimed in claim 4, wherein the system further comprises a second means for erasing the data stored by the first and second storing means in each of the routers, the first router erases upon receiving the control packet sent from the second router and the second router erases upon receiving the returned control packet from the receiving terminal.

\* \* \* \* \*